United States Patent
Koga (10) Patent No.: US 10,357,876 B2
(45) Date of Patent: Jul. 23, 2019

(54) ROBOT SYSTEM

(71) Applicant: FANUC CORPORATION, Yamanashi (JP)

(72) Inventor: Kentaro Koga, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/670,126

(22) Filed: Aug. 7, 2017

(65) Prior Publication Data
US 2018/0043527 A1    Feb. 15, 2018

(30) Foreign Application Priority Data

Aug. 15, 2016 (JP) .................. 2016-159070

(51) Int. Cl.
| | |
|---|---|
| *B65G 43/08* | (2006.01) |
| *B25J 9/00* | (2006.01) |
| *B25J 13/00* | (2006.01) |
| *G05B 19/19* | (2006.01) |
| *G05B 19/408* | (2006.01) |

(52) U.S. Cl.
CPC ............ *B25J 9/0093* (2013.01); *B25J 13/00* (2013.01); *B65G 43/08* (2013.01); *G05B 19/19* (2013.01); *G05B 19/408* (2013.01); *G05B 2219/39102* (2013.01); *Y02P 90/083* (2015.11)

(58) Field of Classification Search
CPC ........ B25J 9/0093; B65G 43/08; G05B 19/19; G05B 19/408
See application file for complete search history.

(56) References Cited

U.S. PATENT DOCUMENTS

| | | | |
|---|---|---|---|
| 3,920,972 A * | 11/1975 | Corwin, Jr. .......... | G05B 19/425 700/251 |
| 4,338,672 A * | 7/1982 | Perzley ................... | B25J 9/161 318/568.13 |
| 5,485,389 A | 1/1996 | Terada et al. | |

(Continued)

FOREIGN PATENT DOCUMENTS

| | | |
|---|---|---|
| EP | 2033747 A2 | 3/2009 |
| JP | H03-100808 A | 4/1991 |

(Continued)

OTHER PUBLICATIONS

Office Action dated Aug. 14, 2018 in corresponding Japanese Application No. 2016-159070; 6 pages.

(Continued)

*Primary Examiner* — William R Harp
(74) *Attorney, Agent, or Firm* — Maier & Maier, PLLC (57) ABSTRACT

A robot system includes a conveying device, a robot, a control unit for controlling operation of the robot by transmitting a drive signal to a motor of the robot, and for outputting a driving speed control signal to the conveying device, and an encoder for detecting a conveying speed of the conveying device in a regular operation mode, where, when the robot is to be operated in a teach mode and a test mode, the control unit transmits a drive signal to the robot such that an operation speed is reduced by a received override value, and outputs the driving speed control signal such that the conveying speed of the conveying device is reduced by the override value.

2 Claims, 4 Drawing Sheets

(56) References Cited

U.S. PATENT DOCUMENTS

| | | | | |
|---|---|---|---|---|
| 5,727,132 A * | 3/1998 | Arimatsu | ........... | G05B 19/4083 |
| | | | | 700/259 |
| 6,163,124 A * | 12/2000 | Ito | .............................. | B25J 9/16 |
| | | | | 318/560 |
| 9,186,794 B2 * | 11/2015 | Suzuki | ..................... | B25J 9/163 |
| 9,604,365 B2 * | 3/2017 | Kanno | .................. | B25J 9/1697 |
| 2005/0075752 A1 * | 4/2005 | Ban | ........................ | B25J 9/1697 |
| | | | | 700/213 |
| 2008/0013825 A1 * | 1/2008 | Nagatsuka | ............. | B25J 9/1671 |
| | | | | 382/153 |
| 2008/0301072 A1 | 12/2008 | Nagatsuka et al. | | |

FOREIGN PATENT DOCUMENTS

| | | |
|---|---|---|
| JP | H04-008485 A | 1/1992 |
| JP | H05-337858 A | 12/1993 |
| JP | H05-345286 A | 12/1993 |
| JP | H07-244512 A | 9/1995 |
| JP | H09-300259 A | 11/1997 |
| JP | 2008-296330 A | 12/2008 |

OTHER PUBLICATIONS

Japanese Office Action dated Feb. 5, 2019, in connection with corresponding JP Application No. 2016-159070 (7 pgs., including machine-generated English translation).

\* cited by examiner

ROBOT SYSTEM

CROSS-REFERENCE TO RELATED APPLICATIONS

This application is based on and claims priority to Japanese Patent Application No. 2016-159070 filed on Aug. 15, 2016, the entire content of which is incorporated herein by reference.

Technical Field

The present invention relates to a robot system including a conveying device and a robot for performing a predetermined action to an object being conveyed by the conveying device.

Background Art

As this type of robot system, there is known a system which includes a surrounding machine such as a deburring machine or a hole drilling machine, and a robot for moving a workpiece to the surrounding machine, and which causes the surrounding machine and the robot to operate in a manual mode, an automatic mode, and a check mode (for example, see PTL 1). With this robot system, in the manual mode, the robot is manually operated to stop at the end of each step, and the surrounding machine is also manually operated if required for checking positions of the robot. Also, in the check mode, the surrounding machine is operated at the same speed as in the automatic mode and the robot is operated at a lower speed than in the automatic mode so as to check the operation of the robot.

There is also known a robot system which includes a conveyor for conveying objects, and a robot for picking up a workpiece on the conveyor, and which includes a teach mode for setting an operation program of the robot and a playback mode for causing the robot to operate based on the operation program (for example, see PTL 2). With this robot system, in the teach mode, an operation is taught to the robot with respect to a workpiece on the conveyor being driven, and in the playback mode, the speed of the robot is adjusted according to the speed of the conveyor, and relative operations of the workpiece and the robot in the playback mode are made coincident with those in the teach mode.

CITATION LIST

Patent Literature

PTL 1
  Japanese Unexamined Patent Application, Publication No. H5-337858
PTL 2
  Japanese Unexamined Patent Application, Publication No. H3-100808

SUMMARY OF INVENTION

A first aspect of the present invention provides a robot system including a conveying device driven by a drive device to convey an object; a robot driven by a plurality of robot driving motors to perform a predetermined action for the object conveyed by the conveying device; and a control unit which controls operation of the robot by transmitting a drive signal to each of the plurality of robot driving motors and which is capable of transmitting, to the drive device, a driving speed control signal for controlling a driving speed of the drive device, wherein the control unit is configured to receive a driving speed of the drive device or a conveying speed of the conveying device in a working operation mode in which the predetermined action is performed by the robot on the object conveyed by the conveying device, and wherein the control unit is configured to receive an override value for reducing an operation speed of the robot from a predetermined speed, and when the robot is to be operated in a teach mode and a test mode, the control unit is configured to transmit the drive signal such that driving speeds of the plurality of robot driving motors are each reduced by the received override value, and transmit the driving speed control signal such that a driving speed of the drive device or a conveying speed of the conveying device is reduced from the driving speed in the working operation mode or the conveying speed in the working operation mode by the override value.

DESCRIPTION OF EMBODIMENTS

Hereinafter, a robot system according to a first embodiment of the present invention will be described with reference to the drawings.

Figure 1:
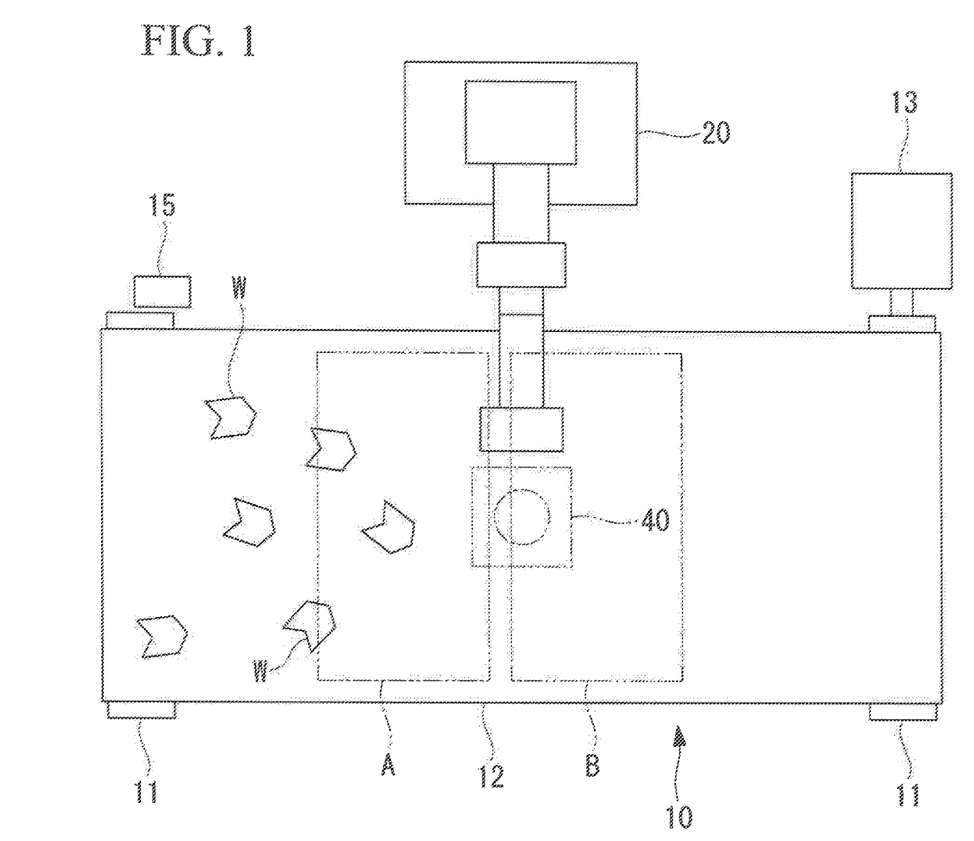
FIG. 1 is a schematic plan view of a robot system according to a first embodiment of the present invention.

As shown in FIG. 1, the robot system includes a conveying device 10, such as a conveyor belt, a robot 20, and a vision sensor 40, and an object W conveyed by the conveying device 10 is picked up by the robot 20, and the object W picked up by the robot 20 is conveyed to a predetermined destination for the next step or the like.

The conveying device 10 includes a belt 12 wound around a plurality of rollers 11, a conveying device motor 13 for driving one of the plurality of rollers 11, a conveying device control unit 14 for controlling operation of the conveying device motor 13, and an encoder 15 as a speed detection means for detecting a conveying speed. For example, the conveying device control unit 14 includes an inverter for supplying drive power to the conveying device motor 13, and the conveying device control unit 14 and the conveying device motor 13 function as a drive means for driving the conveying device 10. An object W is supplied onto the belt 12 by an object supply device, not shown in the figures, and the supplied object W is conveyed in a predetermined direction by rotation of the conveying device motor 13.

The vision sensor 40 includes an image capturing device 41 for capturing an image of the object W on the conveying device 10, an image processing unit 42 for performing predetermined image processing on the image captured by the image capturing device 41, and for transmitting information based on the processed image to a robot control unit 30 of the robot 20, and a memory 43.

The image processing unit 42 applies known image processing, such as static binarization or dynamic binarization, on the captured image, and stores the processed image in the memory 43. The image processing unit 42 may transmit, to the robot control unit 30, the processed image as information based on the processed image, or may transmit, to the robot control unit 30, position information of a feature point (part having a characteristic shape) of each object W shown in the processed image as information based on the processed image.

Figure 2:
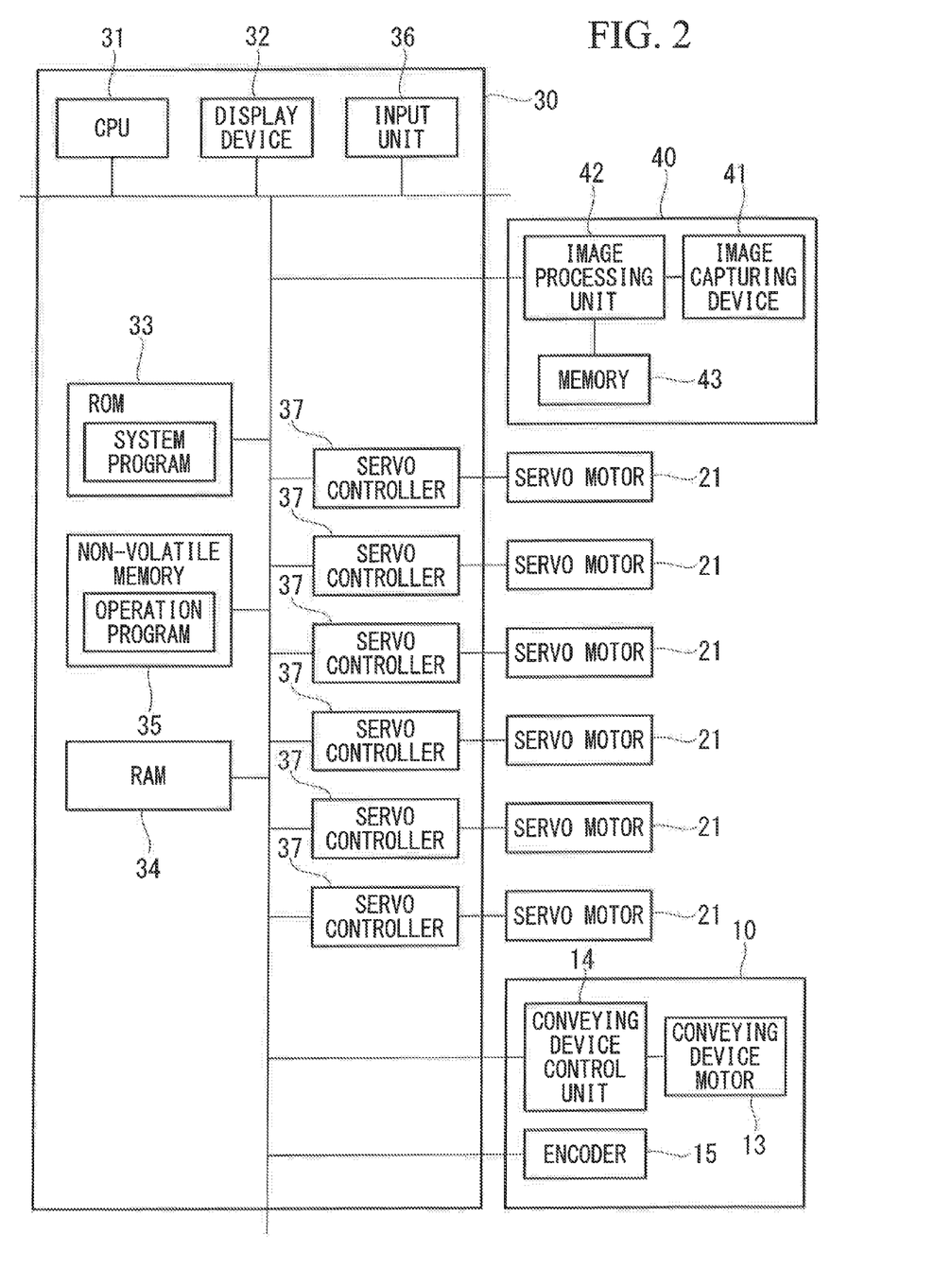
FIG. 2 is a block diagram showing main parts of the robot system according to the first embodiment.

The robot 20 includes a plurality (in the present embodiment, six) of movable parts, and servo motors (robot driving motor) 21 for driving the respective movable parts. Various types of servo motors, such as a rotation motor or a linear cylinder, may be used as each servo motor 21. The robot 20 includes the robot control unit 30 as shown in FIG. 2, and the conveying speed for an object W detected by the encoder 15 is transmitted to the robot control unit 30.

In the present embodiment, the robot control unit 30 includes a CPU 31 as a main processor, a display device 32, a ROM 33, a RAM 34 and a non-volatile memory 35 as storage devices, an input unit 36, which is operated at the time of teaching or the like, and six servo controllers 37 provided so as to correspond to the respective servo motors 21. Each servo controller 37 includes a processor and storage devices, such as a ROM and a RAM, and controls the operation position, the operation speed, and the like of each servo motor 21 by transmission drive signals to a servo amplifier of each servo motor 21.

The ROM 33 stores a system program, and the system program realizes basic functions of the robot control unit 30. Also, the non-volatile memory 35 stores an operation program created, for example, by using the input unit 36. For example, the CPU 31 of the robot control unit 30 operates according to the system program, reads an operation program stored in the non-volatile memory 35 and temporarily stores the operation program in the RAM 34, and controls the servo amplifier of each servo motor 21 according to the readout operation program.

According to the system program, for example, when the robot control unit 30 receives a mode selection signal based on input to the input unit 36, the robot control unit 30 is caused to operate in an automatic mode (working operation mode), a test mode, or a teach mode, according to the mode selection signal. In the automatic mode, the CPU 31 transmits a control signal indicating execution of automatic operation to the conveying device control unit 14, and the conveying device 10 thereby starts conveyance of an object W at a predetermined conveying speed. The conveying speed of the conveying device 10 at this time is detected by the encoder 15, and the CPU 31 receives the detection result and stores the same in the non-volatile memory 35.

In the present embodiment, the CPU 31 receives the conveying speed of the conveying device 10 in the automatic mode from the encoder 15, and stores the conveying speed in the non-volatile memory 35. In contrast, in the case where the conveying speed of the conveying device 10 in the automatic mode is determined in advance based on the requirement specifications or the like, an operator may input the conveying speed to an input means, such as the input unit 36, and the CPU 31 may receive the input conveying speed and store the same in the non-volatile memory 35. Moreover, the CPU 31 may receive, from the conveying device control unit 14, the conveying speed of the conveying device 10 in the automatic mode, held by the conveying device control unit 14, and store the conveying speed in the non-volatile memory 35. In these cases, the encoder 15 may be omitted.

Moreover, in the automatic mode, the robot control unit 30 transmits a control signal to each servo controller 37 based on the operation program stored in the non-volatile memory 35, and the robot 20 thereby automatically picks up the object W conveyed by the conveying device 10 in an automatic operation state. At this time, the robot 20 operates in a state where the speed override value is 100%.

An operation of the robot control unit 30 in the automatic mode will be described. The CPU 31 determines objects W, on the conveying device 10, which are at positions allowing picking up by the robot 20, by using the information based on the processed image received from the vision sensor 40, and transmits a control signal to each servo controller 37 such that objects W determined available is picked up.

At this time, the CPU 31 calculates the position where a target object W is to be caught by the robot 20, based on the time required to catch the target object W by the robot 20 after the information based on the processed image is received from the vision sensor 40 and the conveying speed, stored in the non-volatile memory 35, of the conveying device 10 at the time of the automatic operation for the object W, for example. Then, the CPU 31 transmits a control signal to each servo controller 37 such that the object W is caught at the calculated position.

Here, the operation pattern of the robot 20 may be changed according to the position where an object W is to be caught. For example, in FIG. 1, the operation pattern of the robot 20 for a case of catching an object W disposed in a range A and the operation pattern of the robot 20 for a case of catching an object W disposed in a range B may be made different. Moreover, movement of the robot 20 may be gradually changed between the upstream side and the downstream side within the range A or B. Such adjustment of the operation pattern of the robot 20 is effective in increasing the efficiency of picking up of an object W.

Next, an operation of the robot control unit 30 in the test mode will be described. The test mode is used to check the operation of the robot 20 in a case where an operation program is newly created or changed in the teach mode, for example. When the CPU 31 receives a mode selection signal for changing the mode to the test mode, the CPU 31 transmits, to each servo controller 37, a control signal that is based on the operation program stored in the non-volatile memory 35 and an override value that is input to the input unit 36. The robot 20 thereby operates according to the operation program so as to pick up an object W on the conveying device 10.

Specifically, a numerical value 50% is input to the input unit 36 as the override value, for example, and the CPU 31 reduces a speed command value included in the control signal that is transmitted to each servo controller 37 according to the operation program to 50% of the speed command value in the automatic mode. Accordingly, compared to a case where the robot 20 is operated in the automatic mode according to the operation program, the robot 20 is operated in a state where the speed is reduced to half but with the same movement.

Also, in the test mode, the CPU 31 transmits, to the conveying device control unit 14, a control signal for achieving a conveying speed that is obtained by multiplying the conveying speed in the automatic mode, stored in the non-volatile memory 35, by the override value. Accordingly, the conveying device 10 is operated in a state where the conveying speed is half of that in the automatic mode.

Accordingly, the conveying device 10 conveys an object W at a speed that is according to the override value, in a state where the robot 20 is performing a movement determined by the operation program at a speed that is according to the override value.

Also in the test mode, the CPU 31 determines an object W, on the conveying device 10, which is at a position allowing picking up by the robot 20, on the basis of information based on the processed image received from the vision sensor 40, and transmits a control signal including a speed command value that is reduced by the override value to each servo controller 37 such that an object W determined as available is picked up. At this time, the CPU 31 calculates the position where a target object W is to be caught by the robot 20, based on the time required to catch the target object W by the robot 20 after the information based on the processed image is received from the vision sensor 40 and the conveying speed, of the conveying device 10, reduced by the override value. Then, the CPU 31 transmits a control signal to each servo controller 37 such that the object W is caught at the calculated position.

Additionally, an arbitrary override value may be input to the input unit 36. For example, in the case where the override value input to the input unit 36 is 100%, the robot 20 and the conveying device 10 may be moved, in the test mode, at the same speed as in the automatic mode. Moreover, the operation speed of the robot 20 and the conveying device 10 may be changed according to an input override value, immediately after an arbitrary override value is input to the input unit 36 in a state where the robot 20 and the conveying device 10 are operated in the test mode.

Next, an operation of the robot control unit 30 in the teach mode will be described. The teach mode is a mode for newly creating or changing an operation program for operating the robot 20. As in the case of the test mode, when the CPU 31 receives a mode selection signal for changing to the teach mode, the CPU 31 transmits, to the conveying device control unit 14, a control signal for controlling a conveying speed that is obtained by multiplying the conveying speed in the automatic mode, stored in the non-volatile memory 35, by the override value input to the input unit 36. The conveying device 10 is thereby operated at a low speed that is obtained by multiplying the conveying speed in the automatic mode by the override value. In the teach mode, 20% is input as the override value, for example, and the conveying device 10 is operated at a low speed.

Moreover, the CPU 31 transmits, to each servo controller 37, a control signal that is based on an input instruction to the input unit 36 and the override value, for example. That is, when an operator performs input to the input unit 36, the robot 20 moves according to the input instruction, and its operation speed is according to the override value. For example, in the case where an operation program in which an existing operation program has been partially changed or a new operation program is the input instruction, the robot 20 performs an operation that is determined by the input operation program at an operation speed which has been reduced to 20%.

The operator may store the new or changed operation program in the non-volatile memory 35 by operating the input unit 36.

Additionally, when the CPU 31 receives a mode selection signal for changing to the teach mode, the CPU 31 may transmit a control signal to each servo motor 21, and the CPU 31 may control the conveying device control unit 14, only during operation of the robot 20, such that the conveying device 10 is operated.

Moreover, in the teach mode, the CPU 31 may transmit a control command to the conveying device control unit 14 such that movement only by hand is allowed, and the conveying device 10 may be manually operated.

In the present embodiment, the conveying speed of the conveying device 10 in the automatic mode is detected by the encoder 15, and in the teach mode and the test mode, the conveying speed of the conveying device 10 takes a value that is obtained by reducing the conveying speed in the automatic mode by the override value of the robot 20. Accordingly, even if various override values are used in the teach mode and the test mode, the ratio between the operation speed of the robot 20 and the conveying speed of the conveying device 10 in the teach mode and the test mode is equal to the ratio between the operation speed of the robot 20 and the conveying speed of the conveying device 10 when the robot 20 is operated at an override value of, for example, 100% as a predetermined speed and the conveying device 10 is operated in the automatic mode.

Accordingly, the robot 20 may be constantly operated at an override value of, for example, 100% as the predetermined speed in the automatic mode, and operation management of the robot 20 in the automatic mode is facilitated.

Furthermore, because the ratio between the operation speed of the robot 20 and the conveying speed of the conveying device 10 in the teach mode and the test mode is equal to the ratio between the operation speed of the robot 20 and the conveying speed of the conveying device 10 when the robot 20 is operated at a predetermined speed and the conveying device 10 is operated in the working operation mode, operation of the robot 20 and the conveying device 10 in the working operation mode is in accordance with the operation of the robot 20 and the conveying device 10 in the teach mode and the test mode.

A robot system according to a second embodiment of the present invention will be described with reference to the drawings.

Figure 3:
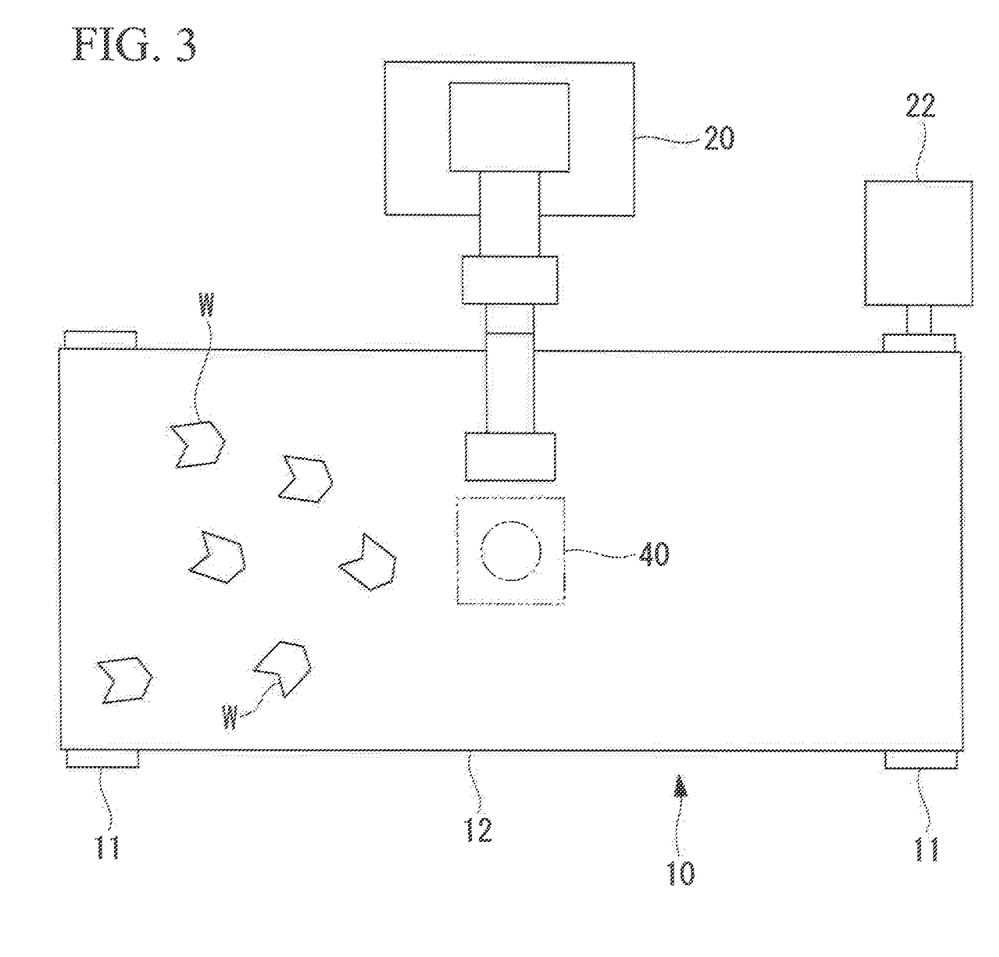
FIG. 3 is a schematic plan view of a robot system according to a second embodiment of the present invention.
Figure 4:
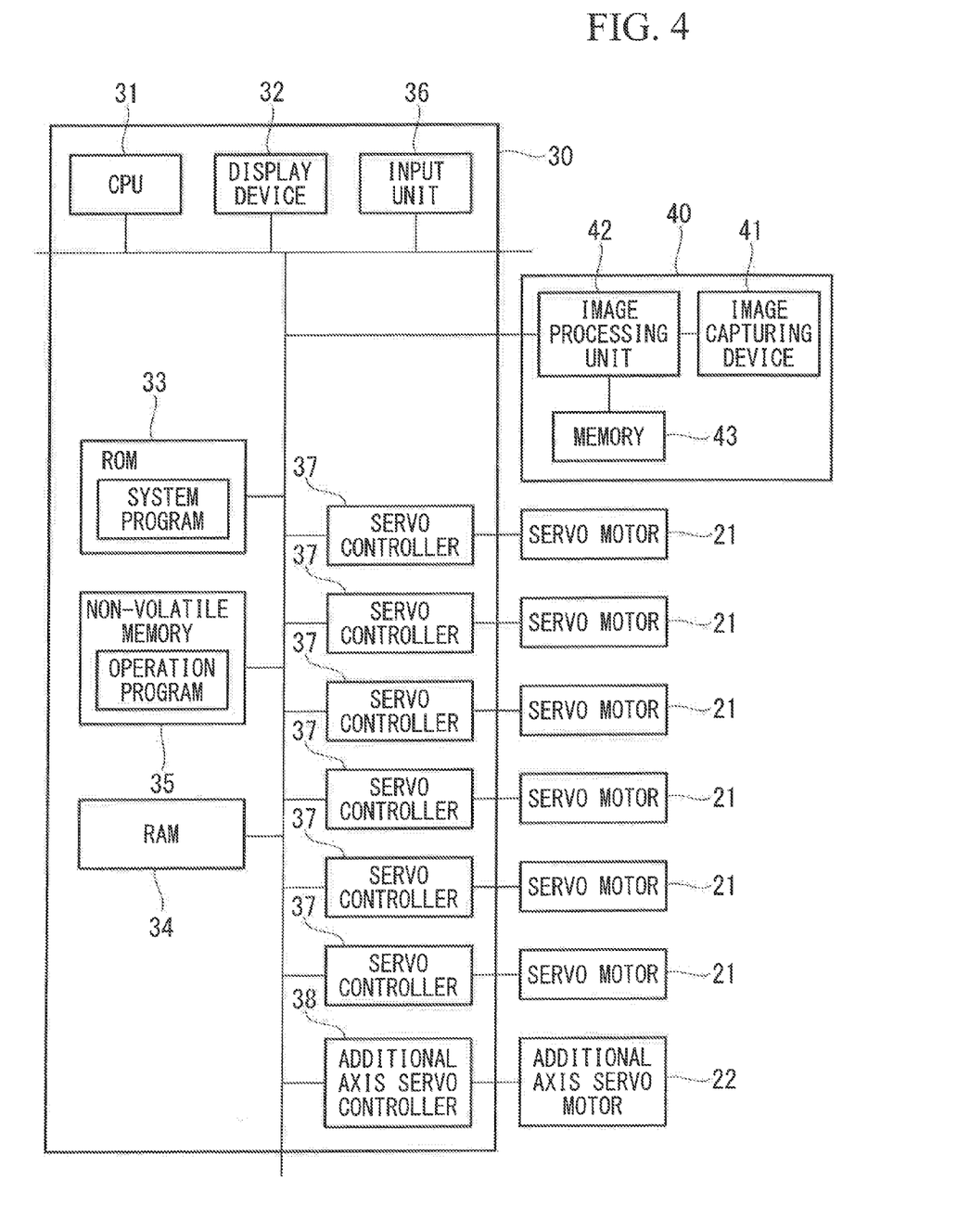
FIG. 4 is a block diagram showing main parts of the robot system according to the second embodiment.

In the present embodiment, the drive means for driving the conveying device 10 is changed from the conveying device motor 13 in the first embodiment to an additional axis servo motor 22 of the robot 20, and also, the conveying device control unit 14 and the encoder 15 are omitted, and the other components are the same as or similar to those in the first embodiment. Components which are the same as or similar to those in the first embodiment are denoted by the same reference signs in the drawings, and description thereof is omitted. Also, operations which are the same as or similar to those in the first embodiment are omitted from the following description.

As shown in FIG. 3, the robot system of the present embodiment includes, as in the first embodiment, the conveying device 10, such as a conveyor belt, the robot 20, and the vision sensor 40.

As in the first embodiment, the robot 20 includes a plurality (in the present embodiment, six) of movable parts, and servo motors (robot driving motor) 21 for driving the respective movable parts. There is also provided an additional axis servo motor 22, and the conveying device 10 is driven by the additional axis servo motor 22. An encoder is provided in the additional axis servo motor 22, and a rotation position or a rotation speed of the additional axis servo motor 22 is detected by the encoder.

As shown in FIG. 4, the conveying device motor 13, the conveying device control unit 14, and the encoder 15 of the first embodiment are omitted from the robot control unit 30, and an additional axis servo controller 38 for transmitting a drive signal to a servo amplifier of the additional axis servo motor 22 is added to the robot control unit 30.

In the automatic mode, the CPU 31 transmits a control signal for driving at a predetermined speed to the additional axis servo controller 38, and the conveying device 10 thereby starts conveying an object W at a predetermined conveying speed. The driving speed of the additional axis servo motor 22 at this time is detected by the built-in encoder, and the CPU 31 receives the detection result and stores the same in the non-volatile memory 35. Also, the CPU 31 calculates a conveying speed of the conveying device 10 for the object W from the detection result, and stores the calculated conveying speed in the non-volatile memory 35.

Also, in the test mode, the CPU 31 transmits, to the additional axis servo controller 38, a control signal for achieving a driving speed that is obtained by multiplying the driving speed detected in the automatic mode and stored in the non-volatile memory 35 by an override value. Accordingly, the conveying device 10 conveys an object W at a speed that is according to the override value, in a state where the robot 20 is performing a movement determined by an operation program at a speed that is according to the override value.

Moreover, in the teach mode, the CPU 31 transmits, to the additional axis servo controller 38, a control signal for achieving a driving speed that is obtained by multiplying the driving speed in the automatic mode, stored in the non-volatile memory 35, by an override value input to the input unit 36. The conveying device 10 is thereby operated at a low speed that is obtained by multiplying the conveying speed in the automatic mode by the override value.

Also in the present embodiment, the CPU 31 receives the driving speed of the additional axis servo motor 22 in the automatic mode, and in the teach mode and the test mode, the driving speed of the additional axis servo motor 22 takes a value that is obtained by reducing the driving speed in the automatic mode by the override value of the robot 20. Accordingly, even if various override values are used in the teach mode and the test mode, the ratio between the operation speed of the robot 20 and the conveying speed of the conveying device 10 in the teach mode and the test mode is equal to the ratio between the operation speed of the robot 20 and the conveying speed of the conveying device 10 when the robot 20 is operated at an override value of, for example, 100% as a predetermined speed and the conveying device 10 is operated in the automatic mode.

Accordingly, the robot 20 may be constantly operated at an override value of, for example, 100% as the predetermined speed in the automatic mode, and therefore operation management of the robot 20 in the automatic mode is facilitated.

Moreover, by using the additional axis servo motor 22 provided in the robot 20, a speed detection means for detecting the conveying speed of the conveying device 10 does not have to be separately provided, and the configuration of the robot system may be simplified.

Additionally, in the first embodiment, the conveying speed of the conveying device 10 is detected by the encoder 15. Alternatively, the encoder 15 may detect the driving speed of the conveying device motor 13 in the automatic mode, and the CPU 31 may store the detected driving speed in the non-volatile memory 35. In this case, in the teach mode and the test mode, the CPU 31 transmits, to the conveying device control unit 14, a control signal for achieving a driving speed that is obtained by multiplying the driving speed stored in the non-volatile memory 35 by an override value input to the input unit 36.

Furthermore, in the first and the second embodiments, the robot 20 performs an action of picking up an object W on the conveying device 10, but the robot 20 may alternatively perform processes such as painting, welding, and the like on an object W on the conveying device 10.

Moreover, in the first and the second embodiments, the conveying device 10 linearly conveys an object W, but the conveying device 10 may alternatively convey an object W along a curved line.

Moreover, the conveying device 10 may repeat conveyance and stopping according to a predetermined operation program. In this case, in the teach mode and the test mode, the conveying speed is reduced according to the override value, and also, the stop time is preferably increased according to the override value.

The inventor has arrived at the following aspects of the present invention.

A first aspect of the present invention provides a robot system including a conveying device driven by a drive means to convey an object; a robot driven by a plurality of robot driving motors to perform a predetermined action for the object conveyed by the conveying device; and a control unit which controls operation of the robot by transmitting a drive signal to each of the plurality of robot driving motors and which is capable of transmitting, to the drive means, a driving speed control signal for controlling a driving speed of the drive means, wherein the control unit is configured to receive a driving speed of the drive means or a conveying speed of the conveying device in a working operation mode in which the predetermined action is performed by the robot on the object conveyed by the conveying device, and wherein the control unit is configured to receive an override value for reducing an operation speed of the robot from a predetermined speed, and when the robot is to be operated in a teach mode and a test mode, the control unit is configured to transmit the drive signal such that driving speeds of the plurality of robot driving motors are each reduced by the received override value, and transmit the driving speed control signal such that a driving speed of the drive means or a conveying speed of the conveying device is reduced from the driving speed in the working operation mode or the conveying speed in the working operation mode by the override value.

According to the aspect described above, the control unit receives the driving speed of the drive means or the conveying speed of the conveying device in the working operation mode, and in the teach mode and the test mode, the driving speed of the drive means or the conveying speed of the conveying device is reduced by the override value of the robot. Accordingly, even if various override values are used in the teach mode and the test mode, the ratio between the operation speed of the robot and the conveying speed of the conveying device in the teach mode and the test mode is equal to the ratio of the operation speed of the robot and the conveying speed of the conveying device at the time when the operation of the robot is returned to the predetermined speed and the conveying device is operated in the working operation mode.

Accordingly, the robot may be constantly operated at the predetermined speed in the working operation mode, and operation management of the robot in the working operation mode is facilitated.

Furthermore, because the ratio between the operation speed of the robot and the conveying speed of the conveying device in the teach mode and the test mode is equal to the ratio between the operation speed of the robot and the conveying speed of the conveying device at the time when the operation of the robot is returned to the predetermined speed and the conveying device is operated in the working operation mode, operation of the robot and the conveying device in the working operation mode becomes inconsistent with the operation of the robot and the conveying device in the teach mode and the test mode.

In the aspect described above, preferably, the drive means is an additional axis motor of the robot, and the control unit is configured to receive a driving speed of the additional axis motor, in the working operation mode, detected by a speed detection means provided in the additional axis motor.

According to such a configuration, by using the additional axis motor provided in the robot, a speed detection means for detecting the conveying speed of the conveying device or a detection means for detecting the driving speed of the drive means of the conveying device does not have to be separately provided, and the configuration of the robot system may be simplified.

In the aspect described above, in the case where the conveying speed of the conveying device at the time of operation in the working operation mode is determined in advance based on requirement specifications or the like, the system is preferably configured to allow an operator to input the conveying speed.

According to such a configuration, a speed detection means for detecting the conveying speed of the conveying device or a detection means for detecting the driving speed of the drive means of the conveying device may be omitted, and the configuration of the robot system may be further simplified.

According to the aforementioned aspects, the burden of teaching work for a robot may be reduced, and operation management of the robot may be facilitated.

REFERENCE SIGNS LIST

10 Conveying device
13 Conveying device motor
14 Conveying device control unit
15 Encoder
20 Robot
21 Servo motor
22 Additional axis servo motor
30 Robot control unit
31 CPU
32 Display device
33 ROM
34 RAM
35 Non-volatile memory
36 Input unit
37 Servo controller
38 Additional axis servo controller
40 Vision sensor
W Object

The invention claimed is:

1. A robot system comprising:
a conveying device driven by a drive device to convey an object;
a robot driven by a plurality of robot driving motors to perform a predetermined action for the object conveyed by the conveying device; and
a control unit which controls operation of the robot by transmitting a drive signal to each of the plurality of robot driving motors and which is capable of transmitting, to the drive device, a driving speed control signal for controlling a driving speed of the drive device; and
an input device to which an operator can input a conveying speed of the conveying device
wherein the control unit is configured to receive a conveying speed of the conveying device input to the input device by the operator, the conveying speed is a speed in a working operation mode in which the predetermined action is performed by the robot on the object conveyed by the conveying device, and
wherein the control unit is configured to receive an override value for reducing an operation speed of the robot from a predetermined speed, and when the robot is to be operated in a teach mode and a test mode, the control unit is configured to transmit the drive signal such that driving speeds of the plurality of robot driving motors are each reduced by the received override value, and transmit the driving speed control signal such that a conveying speed of the conveying device is reduced from the conveying speed in the working operation mode by the override value.

2. A robot system comprising:
a conveying device driven by a drive device to convey an object;
a robot driven by a plurality of robot driving motors to perform a predetermined action for the object conveyed by the conveying device; and
a control unit which controls operation of the robot by transmitting a drive signal to each of the plurality of robot driving motors and which is capable of transmitting, to the drive device, a driving speed control signal for controlling a driving speed of the drive device,
wherein the control unit is configured to receive a driving speed of the drive device or a conveying speed of the conveying device in a working operation mode in which the predetermined action is performed by the robot on the object conveyed by the conveying device, and
wherein the control unit is configured to receive an override value for reducing an operation speed of the robot from a predetermined speed, and when the robot is to be operated in a teach mode and a test mode, the control unit is configured to transmit the drive signal such that driving speeds of the plurality of robot driving motors are each reduced by the received override value, and transmit the driving speed control signal such that a driving speed of the drive device or a conveying speed of the conveying device is reduced from the driving speed in the working operation mode or the conveying speed in the working operation mode by the override value,
wherein the drive device is an additional axis motor of the robot, and
wherein the control unit is configured to receive a driving speed of the additional axis motor, in the working operation mode, detected by a speed detection device provided in the additional axis motor.

* * * * *